United States Patent
Han et al.

(10) Patent No.: US 11,713,044 B2
(45) Date of Patent: Aug. 1, 2023

(54) VEHICLE FOR ESTIMATION A STATE OF THE OTHER VEHICLE USING REFERENCE POINT OF THE OTHER VEHICLE, AND METHOD OF CONTROLLING THE VEHICLE

(71) Applicants: HYUNDAI MOTOR COMPANY, Seoul (KR); KIA CORPORATION, Seoul (KR)

(72) Inventors: Jihee Han, Seoul (KR); Jong Hoon Kwak, Gunpo-si (KR); Heechul Choi, Seoul (KR); Jonghyuk Lim, Seoul (KR); Junsik An, Seoul (KR); Junhyung Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 162 days.

(21) Appl. No.: 17/341,793

(22) Filed: Jun. 8, 2021

(65) Prior Publication Data
US 2022/0080974 A1    Mar. 17, 2022

(30) Foreign Application Priority Data
Sep. 17, 2020    (KR) .................. 10-2020-0119660

(51) Int. Cl.
*G06T 7/62*    (2017.01)
*G06T 7/73*    (2017.01)
(Continued)

(52) U.S. Cl.
CPC ........ *B60W 40/04* (2013.01); *B60W 30/0956* (2013.01); *G06T 7/62* (2017.01);
(Continued)

(58) Field of Classification Search
CPC .................................................... B60W 40/04
See application file for complete search history.

(56) References Cited

U.S. PATENT DOCUMENTS 8,290,211 B2 * 10/2012 Takahashi .............. G08G 1/017
                                                        382/104
9,168,868 B2 * 10/2015 Stein ...................... G08G 1/161
(Continued)

FOREIGN PATENT DOCUMENTS

CN    103578115 A  *  2/2014   ......... G06K 9/00805
CN    105096655 A  *  11/2015  ............... B60R 1/00
(Continued)

OTHER PUBLICATIONS

Machine Translation with Paragraph Nos. of KR 20150096924 A, Espacenet (Year: 2015).*
(Continued)

*Primary Examiner* — Navid Z. Mehdizadeh
*Assistant Examiner* — Kenneth M Dunne
(74) *Attorney, Agent, or Firm* — Morgan, Lewis & Bockius LLP

(57) ABSTRACT

A vehicle may include a camera configured to obtain an image of at least one surrounding vehicle; and a controller configured to determine object recognition data including at least one of full area data, wheel area data, and bumper area data of the surrounding vehicle from the image of the at least one surrounding vehicle, based on the object recognition data, to set a reference point in the at least one of the full area data, the wheel area data, and the bumper area data of the surrounding vehicle from the image of the surrounding vehicle, and to predict a driving speed of the surrounding vehicle based on a change in a position of the reference point.

20 Claims, 13 Drawing Sheets

| | | | | |
|---|---|---|---|---|
| 1 | Full Body | F/R Bumper | Wheel | |
| 2 | Full Body | | Wheel | ~310 |
| 3 | Full Body | F/R Bumper | | |
| 4 | | | Wheel | |
| 5 | | F/R Bumper | Wheel | ~320 |
| 6 | Full Body | | | |

(51) Int. Cl.
  *B60W 30/095* (2012.01)
  *G06V 10/42* (2022.01)
  *G06V 10/44* (2022.01)
  *G06V 20/58* (2022.01)
  *B60W 40/04* (2006.01)

(52) U.S. Cl.
  CPC ............... *G06T 7/73* (2017.01); *G06V 10/42* (2022.01); *G06V 10/44* (2022.01); *G06V 20/58* (2022.01); *B60W 2420/42* (2013.01); *B60W 2554/4041* (2020.02); *B60W 2554/4042* (2020.02); *B60W 2554/4043* (2020.02); *B60W 2554/801* (2020.02); *B60W 2554/802* (2020.02); *G06T 2207/30261* (2013.01)

(56) References Cited

U.S. PATENT DOCUMENTS

| | | | | |
|---|---|---|---|---|
| 2005/0225636 | A1* | 10/2005 | Maemura | H04N 7/181 348/E7.086 |
| 2011/0301779 | A1* | 12/2011 | Shida | G01S 19/51 701/1 |
| 2012/0019655 | A1* | 1/2012 | Fukamachi | G06T 7/215 348/142 |
| 2014/0292545 | A1* | 10/2014 | Nemoto | B60W 30/162 340/988 |
| 2021/0224560 | A1* | 7/2021 | Kim | G01C 21/3602 |
| 2022/0004784 | A1* | 1/2022 | Tian | G06V 10/40 |
| 2022/0055618 | A1* | 2/2022 | Toyoda | B60W 40/105 |

FOREIGN PATENT DOCUMENTS

| | | | | |
|---|---|---|---|---|
| JP | 2012027595 | A | * | 2/2012 |
| JP | 2014106901 | A | * | 6/2014 |
| KR | 20130015982 | A | * | 2/2013 |
| KR | 20150096924 | A | * | 8/2015 | ........ B60W 30/0956 |
| KR | 20160000495 | A | * | 1/2016 |
| WO | WO-2016084502 | A1 | * | 6/2016 | ........... G01S 13/867 |
| WO | WO-2017027212 | A1 | * | 2/2017 | ............. G06T 7/246 |

OTHER PUBLICATIONS

Jae-Young Choi et al., "Multiple Vehicles Detection and Tracking based on Scale-Invariant Feature Transform", 2007, IEEE (Year: 2007).*

Neeraj K. Kanhere etal, "Vehicle Segmentation and Tracking from a Low-Angle Off-Axis Camera", 2005, IEEE (Year: 2005).*

* cited by examiner

FIG. 3

| 1 | Full Body | F/R Bumper | Wheel |
|---|---|---|---|
| 2 | Full Body |  | Wheel |
| 3 | Full Body | F/R Bumper |  |
| 4 |  |  | Wheel |
| 5 |  | F/R Bumper | Wheel |
| 6 | Full Body |  |  |

Rows 1–3: 310
Rows 4–6: 320

VEHICLE FOR ESTIMATION A STATE OF THE OTHER VEHICLE USING REFERENCE POINT OF THE OTHER VEHICLE, AND METHOD OF CONTROLLING THE VEHICLE

CROSS-REFERENCE TO RELATED APPLICATION(S)

The present application claims priority to Korean Patent Application No. 10-2020-0119660, filed on Sep. 17, 2020, the entire contents of which is incorporated herein for all purposes by this reference.

BACKGROUND OF THE INVENTION

Field of the Invention

The present invention relates to a vehicle and a method of controlling the vehicle.

Description of Related Art

An autonomous driving system of a vehicle refers to a system that automatically drives to a provided destination by recognizing a road environment by itself, determining a driving situation, and controlling the vehicle according to a planned driving path.

In a case of the autonomous driving systems, a distance is actively controlled based on a driving speed of the vehicle, a driving speed of a surrounding vehicle and a preceding vehicle.

However, there are cases in which a safety distance from surrounding vehicles is not secured and sudden braking is performed.

In the instant case, even if a user's vehicle is at a sufficient distance, a risk of collision due to sudden braking increases.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for setting a reference point based on a combination of objects recognized by a surrounding vehicle, and determining a speed of the surrounding vehicle using the reference point, and a method of controlling the vehicle.

Additional aspects of the present invention will be set forth in part in the description which follows, and in part, will be obvious from the description, or may be learned by practice of the present invention.

According to various aspects of the present invention, there is provided a vehicle including: a camera configured to obtain an image of at least one surrounding vehicle; and a controller configured to determine object recognition data including at least one of full area data, wheel area data, and bumper area data of the surrounding vehicle, based on the object recognition data, to set a reference point in the at least one of the full area data, the wheel area data, and the bumper area data of the surrounding vehicle from the image of the surrounding vehicle, and to predict a driving speed of the surrounding vehicle based on a change in a position of the reference point.

The controller may be configured to determine actual distance coordinates of the reference point, and to determine longitudinal distance coordinates and lateral distance coordinates between the surrounding vehicle and the vehicle using the determined actual distance coordinates of the reference point.

The controller may be configured to determine a longitudinal speed of the surrounding vehicle and a lateral speed of the surrounding vehicle using the actual distance coordinates of the reference point.

The controller may be configured to predict the driving speed of the surrounding vehicle by applying at least one of the longitudinal distance coordinates, the lateral distance coordinates, the longitudinal speed, and the lateral speed to a Kalman filter.

In a response to a case where the full area data of the surrounding vehicle, the front or rear bumper area data of the surrounding vehicle, and the wheel area data of the surrounding vehicle are derived, the controller may be configured to pair a full area of the surrounding vehicle, a front or rear bumper area of the surrounding vehicle, and a wheel area of the surrounding vehicle.

In a response to a case where the full area data of the surrounding vehicle and the wheel area data of the surrounding vehicle are derived, the controller may be configured to set a reference point in a wheel area.

In a response to a case where the full area data of the surrounding vehicle and the front or rear bumper area data of the surrounding vehicle are derived, the controller may be configured to pair a full area of the surrounding vehicle and a front or rear bumper area of the surrounding vehicle.

In a response to a case where the full area data of the surrounding vehicle and the front or rear bumper area data of the surrounding vehicle are derived, the controller may be configured to set a reference point in front or rear bumper areas.

In a response to a case where the full area data of the surrounding vehicle and the wheel area data of the surrounding vehicle are derived, the controller may be configured to pair a full area of the surrounding vehicle and a wheel area of the surrounding vehicle.

In a response to a case where the full area data of the surrounding vehicle and the wheel area data of the surrounding vehicle are derived, the controller may be configured to set a reference point in a wheel area.

According to various aspects of the present invention, there is provided a method of controlling a vehicle including: obtaining, by a camera, an image of at least one surrounding vehicle; deriving, by a controller, object recognition data including at least one of full area data, wheel area data, and bumper area data of the surrounding vehicle from the image of the at least one surrounding vehicle; according to the object recognition data, setting, by the controller, a reference point in at least one of the full area data, the wheel area data, and the bumper area data of the surrounding vehicle from the image of the surrounding vehicle; and predicting, by the controller, a driving speed of the surrounding vehicle based on a change in a position of the reference point.

The method may further include determining, by the controller, actual distance coordinates of the reference point; and determining, by the controller, longitudinal distance coordinates and lateral distance coordinates between the surrounding vehicle and the vehicle using the determined actual distance coordinates of the reference point.

The method may further include determining, by the controller, a longitudinal speed of the surrounding vehicle and a lateral speed of the surrounding vehicle using the actual distance coordinates of the reference point.

The method may further include predicting, by the controller, the driving speed of the surrounding vehicle by applying at least one of the longitudinal distance coordinates, the lateral distance coordinates, the longitudinal speed, and the lateral speed to a Kalman filter.

The method may further include, in a response to a case where the full area data of the surrounding vehicle, the front or rear bumper area data of the surrounding vehicle, and the wheel area data of the surrounding vehicle are derived, pairing, by the controller, a full area of the surrounding vehicle, a front or rear bumper area of the surrounding vehicle, and a wheel area of the surrounding vehicle.

The method may further include, in a response to a case where the full area data of the surrounding vehicle and the wheel area data of the surrounding vehicle are derived, setting, by the controller, a reference point in a wheel area.

The method may further include, in a response to a case where the full area data of the surrounding vehicle and the front or rear bumper area data of the surrounding vehicle are derived, pairing, by the controller, a full area of the surrounding vehicle and a front or rear bumper area of the surrounding vehicle.

The method may further include, in a response to a case where the full area data of the surrounding vehicle and the front or rear bumper area data of the surrounding vehicle are derived, setting, by the controller, a reference point in front or rear bumper areas.

The method may further include, in a response to a case where the full area data of the surrounding vehicle and the wheel area data of the surrounding vehicle are derived, pairing, by the controller, a full area of the surrounding vehicle and a wheel area of the surrounding vehicle.

The method may further include, in a response to a case where the full area data of the surrounding vehicle and the wheel area data of the surrounding vehicle are derived, setting, by the controller, a reference point in a wheel area.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a table illustrating a method of performing pairing of a vehicle according to various exemplary embodiments of the present invention.

Figure 1:
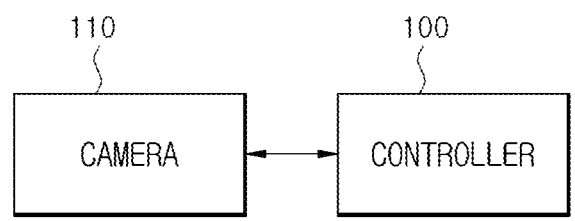
FIG. 1 is a control block diagram of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of the exemplary embodiments of the present invention will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Furthermore, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present invention will be described with reference to accompanying drawings.

FIG. 1 is a control block diagram of a vehicle according to various exemplary embodiments of the present invention.

Referring to FIG. 1, a vehicle 1 may include a camera 110 that obtains images of a surrounding vehicle and a controller 100. The controller 100 may determine object recognition data including at least one of full area data, wheel area data, and bumper area data of the surrounding vehicle from the images of the surrounding vehicle obtained from the camera 110, set a reference point of the object recognition data for each of the images, predict a driving speed of the surrounding vehicle based on a position of the reference point of the object recognition data for each of the images, and control the vehicle 1 based on the driving speed of the surrounding vehicle.

The camera 110 may have a plurality of channels, and may obtain images around the vehicle 1.

In more detail, the camera 110 may obtain an image of the surrounding vehicle driving around the vehicle 1, and may obtain a plurality of images of the surrounding vehicle. In the instant case, the camera 110 may obtain the plurality of images of the surrounding vehicle at predetermined time intervals, and the number of obtained images is not limited.

The camera 110 may be a Surround View Monitor (SVM) provided in the vehicle 1.

The camera 110 may include a charge-coupled device (CCD) or a complimentary metal-oxide semiconductor (CMOS) color image sensor. Here, both CCD and CMOS may refer to a sensor that converts and stores light that has entered through lens of the camera 110 into an electrical signal.

The controller 100 may recognize the position of the surrounding vehicle through deep running in the image of the surrounding vehicle obtained from the camera 110.

Hereinafter, a method of determining the driving speed of the surrounding vehicle will be described.

The controller 100 may obtain the image of the surrounding vehicle from the camera 110.

The controller 100 may obtain the plurality of images of the surrounding vehicle, and the plurality of images may be image frames captured according to the predetermined time interval, and the number of a plurality of image frames may be determined in advance.

The controller 100 may detect at least one of a full area of the surrounding vehicle, a wheel area of the surrounding vehicle, a front bumper area of the surrounding vehicle, and a rear bumper area of the surrounding vehicle from the plurality of images of the surrounding vehicle.

Here, the area corresponding to the full area data of the surrounding vehicle may be a full body area of the surrounding vehicle.

The controller 100 may derive the object recognition data by forming a bounding box in the image corresponding to the full area of the surrounding vehicle, the wheel area of the surrounding vehicle, the front bumper area of the surrounding vehicle, and the rear bumper area of the surrounding vehicle.

In more detail, the controller 100 may derive the full area data corresponding to the full area of the surrounding vehicle, and may derive the wheel area data corresponding to the wheel area of the surrounding vehicle.

The controller 100 sets a reference point in at least one of the full area of the surrounding vehicle, the wheel area of the surrounding vehicle, the front bumper area of the surrounding vehicle, and the rear bumper area of the surrounding vehicle of the derived object recognition data.

For example, when the full area data of the surrounding vehicle, the front or rear bumper area data of the surrounding vehicle, and the wheel area data of the surrounding vehicle are derived, the controller 100 may pair the full area of the surrounding vehicle with the front or rear bumper area of the surrounding vehicle and the wheel area of the surrounding vehicle, and may set the reference point in the wheel area.

For example, when the full area data of the surrounding vehicle and the wheel area data of the surrounding vehicle are derived, the controller 100 may pair the full area of the surrounding vehicle with the wheel area of the surrounding vehicle, and may set the reference point in the wheel area. Here, the pairing may refer to an operation of grouping the areas of the surrounding vehicle into a set.

For example, when the full area data of the surrounding vehicle and the front or rear bumper area data of the surrounding vehicle are derived, the controller 100 may pair the full area of the surrounding vehicle with the front or rear bumper area of the surrounding vehicle, and may set the reference point in the front or rear bumper area.

For example, when the full area data of the surrounding vehicle is not derived, and only data of the front or rear bumper area of the surrounding vehicle is derived, the controller 100 may set the reference point in the front or rear bumper area.

For example, when the full area data of the surrounding vehicle is not derived, but only the wheel area data of the surrounding vehicle is derived, the controller 100 may set the reference point in the wheel area.

The controller 100 may set the reference point in consideration of a change amount in a midpoint of the object recognition data derived from a previous image of the surrounding vehicle and a midpoint of the object recognition data derived from a current image.

As described above, the reason for setting the reference point to a different position for each of various object recognition data may be to prevent the accuracy from deteriorating due to external influences other than a movement of the surrounding vehicle.

Furthermore, the reason for setting the reference point in the wheel area of the surrounding vehicle is that the wheel of the surrounding vehicle is in contact with a ground, so when estimating a distance based on a Leisure Utility Vehicle (LUT), the accuracy may be higher than when the reference point is set in the front or rear bumper area of the surrounding vehicle separated from the ground.

When setting the reference point in the wheel area, the controller 100 may set a midpoint of a line segment in which the wheel area contacts with the ground as the reference point.

When two or more wheel area data are derived for the same surrounding vehicle, the controller 100 may select the wheel area data located closer to the vehicle 1 from among the two or more wheel area data and set the reference point to the wheel area data.

When setting the reference point in the front or rear bumper area, the controller 100 may set a point near a center portion of the image of the surrounding vehicle at a bottom portion of the bumper area as the reference point.

For example, when setting the reference point in the front or rear bumper area, the controller 100 may set a point in contact with the center portion of the image of the surrounding vehicle and a lower end portion of the bumper area as the reference point.

The controller 100 may determine the coordinates of the reference point and may determine the coordinates of the vehicle 1. In the instant case, the controller 100 may determine actual distance coordinates of the reference point using an actual distance to the vehicle 1.

The controller 100 may determine at least one of a longitudinal distance and a lateral distance between the vehicle 1 and the surrounding vehicle using the actual distance coordinates of the reference point. Here, the longitudinal distance may refer to a distance determined based on an X coordinate between the vehicle 1 and the surrounding vehicle, and the lateral distance may refer to a distance determined based on a Y coordinate between the vehicle 1 and the surrounding vehicle. However, it is not limited thereto.

The controller 100 may determine a longitudinal speed and a lateral speed of the surrounding vehicle using the actual distance coordinates of the reference point, the longitudinal distance, and the lateral distance.

The controller 100 may predict the driving speed of the surrounding vehicle using a Kalman filter.

For example, the controller 100 may determine the driving speed of the surrounding vehicle using a first image and a second image of the surrounding vehicle captured at predetermined time intervals. In the instant case, the first image may be an image captured before a predetermined time than a time when the second image was captured. Here, the controller 100 may determine the longitudinal speed (m/frame) and the lateral speed (m/frame) by compairing the change amount in the longitudinal distance coordinates and lateral distance coordinates determined from the first image and the longitudinal distance coordinates and lateral distance coordinates determined from the second image.

In more detail, the controller 100 may predict the current driving speed of the surrounding vehicle by applying the determined longitudinal distance coordinates, lateral distance coordinates, longitudinal speed, and lateral speed to the Kalman filter.

The controller 100 may control the speed of the vehicle 1 based on the predicted driving speed.

FIGS. 2A-2F are views for describing an operation of pairing an object area of a vehicle and an operation of setting a reference point according to various exemplary embodiments of the present invention.

Figure 2A:
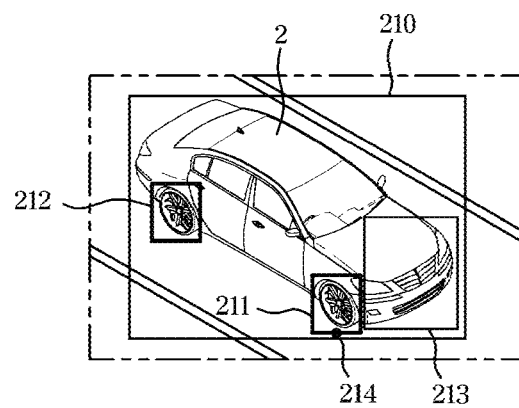
FIG. 2A, FIG. 2B, FIG. 2C, FIG. 2D, FIG. 2E, and FIG. 2F are views for describing an operation of pairing an object area of a vehicle and an operation of setting a reference point according to various exemplary embodiments of the present invention.

FIG. 2A is a view for describing an operation of pairing when object recognition data including data of a full area 210, data of wheel areas 211 and 212, and data of a bumper area 213 of the surrounding vehicle 2 from the image of the surrounding vehicle 2 is derived.

Referring to FIG. 2A, the vehicle 1 may pair the full area 210, the wheel areas 211 and 212, and the bumper area 213 of the surrounding vehicle 2.

The vehicle 1 may set a reference point 214 in the wheel area 211 and may set the reference point 214 at the point where the wheel contacts with the ground.

Figure 2B:
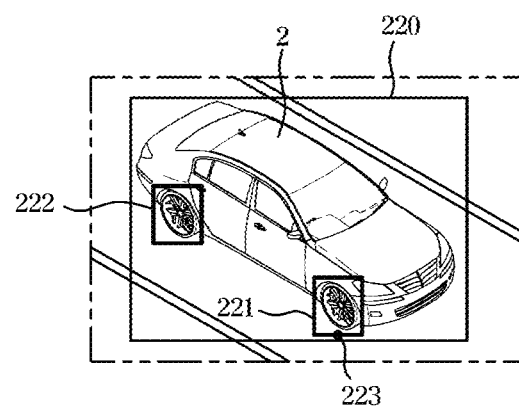

FIG. 2B is a view for describing an operation of pairing when object recognition data including data of a full area 220, and data of wheel areas 221 and 222 of the surrounding vehicle 2 from the image of the surrounding vehicle 2 is derived.

Referring to FIG. 2B, the vehicle 1 may pair the full area 220 and the wheel areas 221 and 222 of the surrounding vehicle 2.

The vehicle 1 may set a reference point 223 in the wheel area 221 and may set the reference point 223 at the point where the wheel contacts with the ground.

Figure 2C:
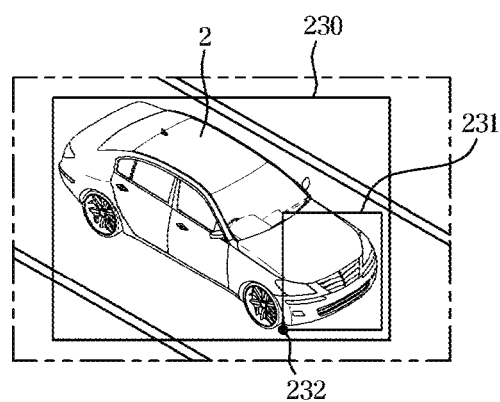

FIG. 2C is a view for describing an operation of pairing when object recognition data including data of a full area 230 and data of a bumper area 231 of the surrounding vehicle 2 from the image of the surrounding vehicle 2 is derived.

Referring to FIG. 2C, the vehicle 1 may pair the full area 230 and the bumper area 231 of the surrounding vehicle 2.

The vehicle 1 may set a reference point 232 in the bumper area 231 and may set the reference point 232 at the bottom portion of the bumper area 231.

Figure 2D:
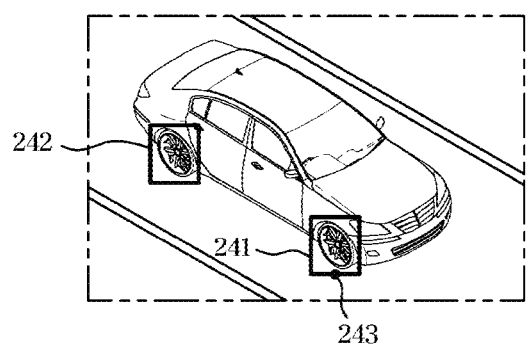

FIG. 2D is a view for describing an operation of pairing when object recognition data including data of data of wheel areas 241 and 242 of the surrounding vehicle 2 from the image of the surrounding vehicle 2 is derived.

The vehicle 1 may set a reference point 243 in the wheel areas 241 and 242 and may set the reference point 243 at the point where the wheel contacts with the ground.

Figure 2E:
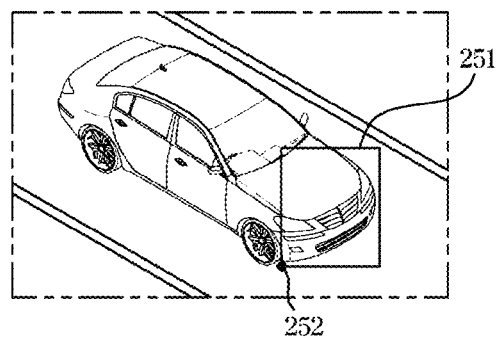

FIG. 2E is a view for describing an operation of pairing when object recognition data including data of a bumper area 251 of the surrounding vehicle 2 from the image of the surrounding vehicle 2 is derived.

The vehicle 1 may set a reference point 252 in the bumper area 251 and may set the reference point 252 at the bottom portion of the bumper area 251.

Figure 2F:
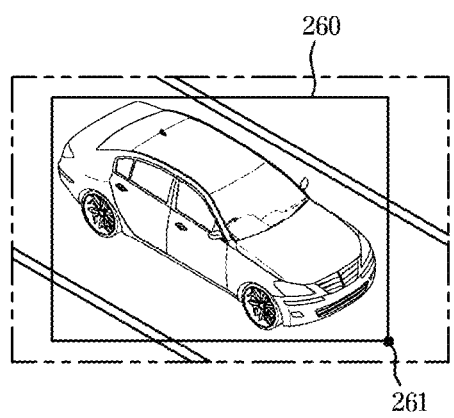

FIG. 2F is a view for describing an operation of pairing when object recognition data including data of a full area 260 of the surrounding vehicle 2 from the image of the surrounding vehicle 2 is derived.

The vehicle 1 may set a reference point 261 in the full area 260.

FIG. 3 is a table illustrating a method of performing pairing of a vehicle according to various exemplary embodiments of the present invention.

Referring to FIG. 3, when the full area data (Full body) of the surrounding vehicle 2 is detected and at least one of the front or rear bumper area data (Front/Rear Bumper) of the surrounding vehicle 2, and the wheel area data (Wheel) is derived, the vehicle 1 may perform pairing (310).

For example, as illustrated in FIG. 3, when the full area data (Full Body) of the surrounding vehicle 2, the front or rear bumper area data (Front/Rear Bumper) of the surrounding vehicle 2, and the wheel area data (Wheel) of the surrounding vehicle 2 are derived, the vehicle 1 may pair all of the full area data (Full Body) of the surrounding vehicle 2, the front or rear bumper area data (Front/Rear Bumper) of the surrounding vehicle 2, and the wheel area data (Wheel) of the surrounding vehicle 2.

For example, as illustrated in FIG. 3, when the full area data (Full Body) of the surrounding vehicle 2 and the wheel area data (Wheel) of the surrounding vehicle 2 are derived, the vehicle 1 may pair the full area (full body) data of the surrounding vehicle 2 and the wheel area data (Wheel) of the surrounding vehicle 2.

For example, when the full area data (Full Body) of the surrounding vehicle 2 and the front or rear bumper area data (Front/Rear Bumper) of the surrounding vehicle 2 are derived, the vehicle 1 may pair the full area data (Full Body)

of the surrounding vehicle 2 and the front or rear bumper area data (Front/Rear Bumper) of the surrounding vehicle 2.

Referring to FIG. 3, when the full area data (Full Body) of the surrounding vehicle 2 is derived, but the front or rear bumper area data (Front/Rear Bumper) and the wheel area data (Wheel) of the surrounding vehicle 2 are not derived, the vehicle 1 may not perform pairing (320).

Furthermore, when the full area data (Full Body) of the surrounding vehicle 2 is not derived, and only at least one of the front or rear bumper area data (Front/Rear Bumper) and the wheel area data (Wheel) of the surrounding vehicle 2 derived, the vehicle 1 may not perform pairing (320).

For example, when only the wheel area data (Wheel) of the surrounding vehicle 2 is derived, the vehicle 1 may not perform pairing.

For example, when the front or rear bumper area data (Front/Rear Bumper) of the surrounding vehicle 2 and the wheel area data (Wheel) of the surrounding vehicle 2 are derived, the vehicle 1 may not perform pairing.

For example, when only full body area (Full Body) of the surrounding vehicle 2 is derived, the vehicle 1 may not perform pairing.

Figure 4:
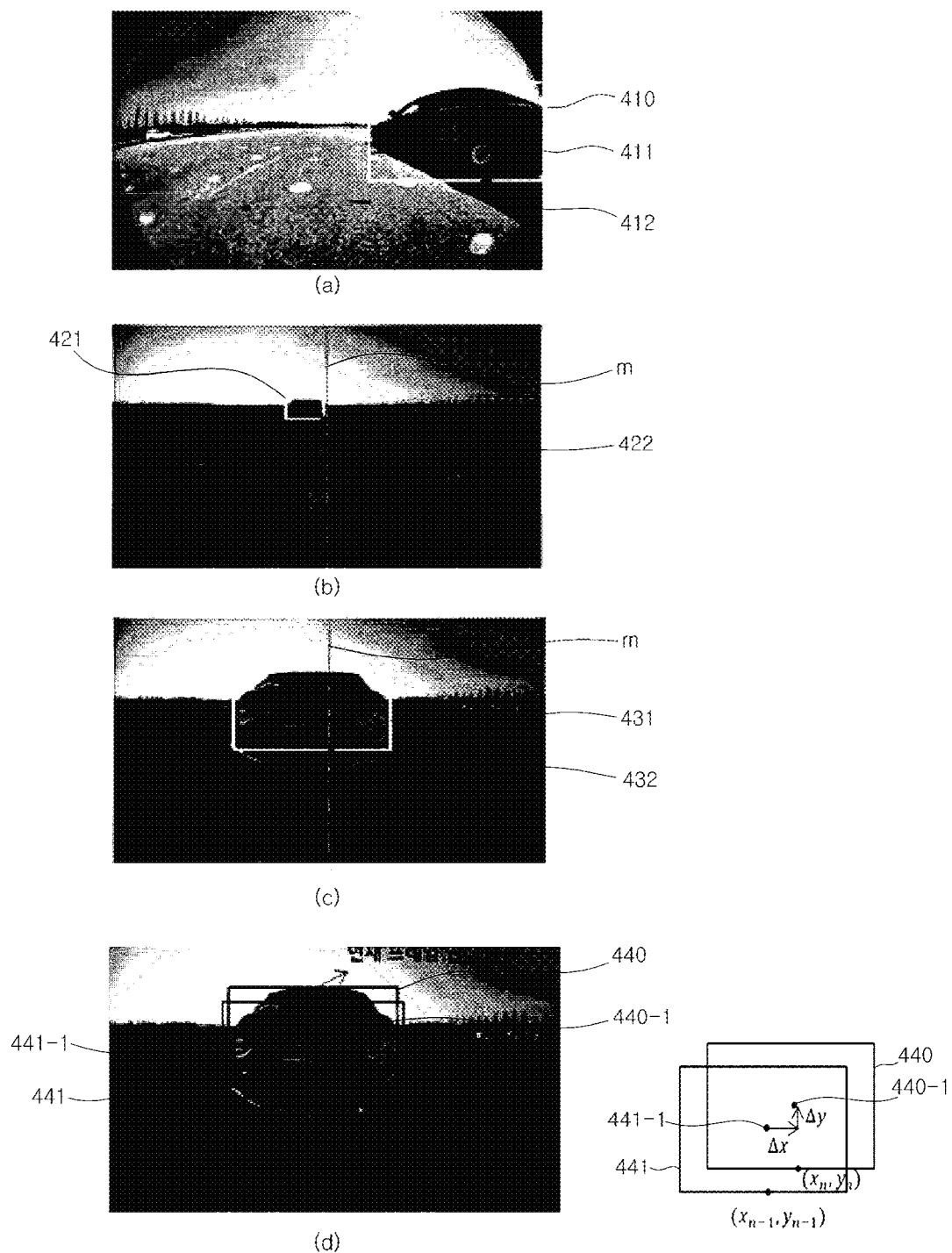
FIG. 4 is a view exemplarily illustrating a method of setting a reference point of a vehicle according to various exemplary embodiments of the present invention.

FIG. 4 is a view exemplarily illustrating a method of setting a reference point of a vehicle according to various exemplary embodiments of the present invention.

Referring to FIG. 4A, when the full area of the surrounding vehicle 2 and the wheel area of the surrounding vehicle 2 are detected, the vehicle 1 may derive full area data 410 and wheel area data 411 by forming a bounding box in the image corresponding to the full area and the wheel area.

The vehicle 1 may set the midpoint of the bottom side of the bounding box of the wheel area data 411 as a reference point 412.

Referring to FIG. 4B, when the rear bumper area of the surrounding vehicle 2 is detected, the vehicle 1 may derive rear bumper area data 421 by forming the bounding box in the image corresponding to the rear bumper area.

The vehicle 1 may set a point where the bounding box of the rear bumper area data 421 meets the line segment m passing through the center portion of the screen image meet as a reference point 422.

Referring to FIG. 4C, when the rear bumper area of the surrounding vehicle 2 is detected, the vehicle 1 may derive rear bumper area data 421 by forming the bounding box in the image corresponding to the rear bumper area.

The vehicle 1 may set a point where the bounding box of the rear bumper area data 431 meets the line segment m passing through the center portion of the screen image meet as a reference point 432.

Referring to FIG. 4D, the vehicle 1 may set the reference point of the rear bumper area data 440 of the surrounding vehicle 2 by compairing a midpoint 440-1 of the rear bumper area data 440 of the surrounding vehicle 2 with a midpoint 441-1 of the rear bumper area data 441 of the same surrounding vehicle 2 derived previously.

FIG. 5A, FIG. 5B, FIG. 5C and FIG. 5D are views exemplarily illustrating a method of setting a reference point of a vehicle according to another exemplary embodiment of the present invention.

Referring to FIG. 5A, FIG. 5B, FIG. 5C, and FIG. 5D, continuous images of the surrounding vehicle 2 driving on a side lane of a lane in which the vehicle 1 is driving are illustrated.

Figure 5A:
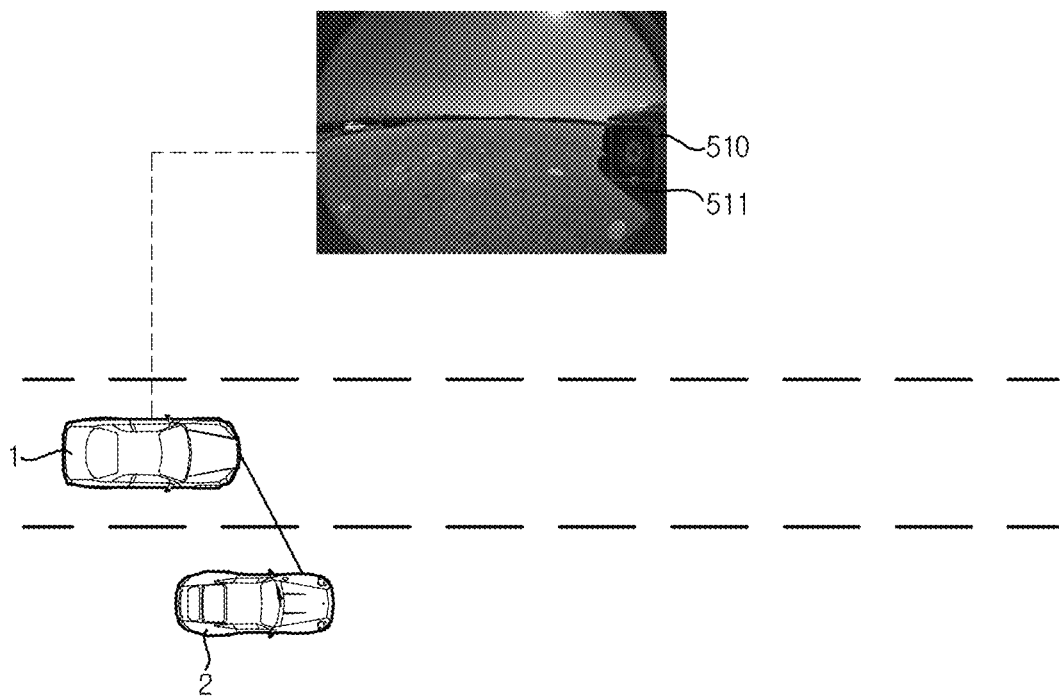
FIG. 5A, FIG. 5B, FIG. 5C and FIG. 5D are views exemplarily illustrating a method of setting a reference point of a vehicle according to another exemplary embodiment of the present invention.

Referring to FIG. 5A, when the front wheel area of the surrounding vehicle 2 is detected, the vehicle 1 may form front wheel area data 510 by forming the bounding box and set the midpoint of the bottom side of the bounding box as a reference point 511.

Figure 5B:
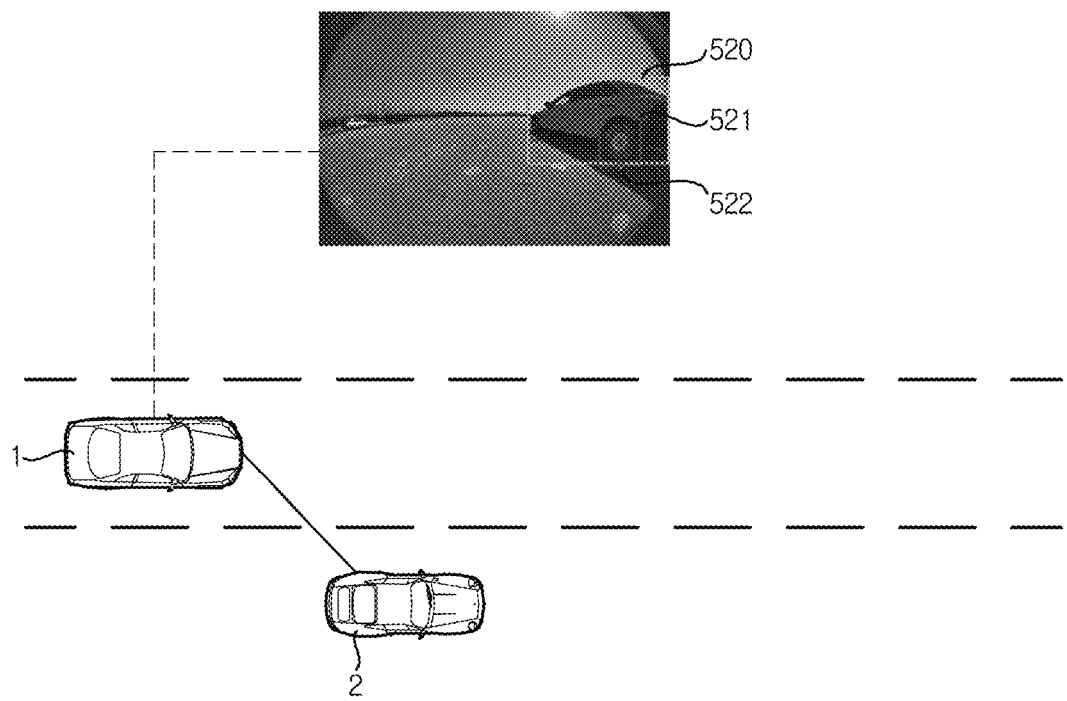

Referring to FIG. 5B, when the rear wheel area of the surrounding vehicle 2 and the full area of the surrounding vehicle 2 are detected, the vehicle 1 may form the bounding box to derive rear wheel area data 521 and full area data 520 of the surrounding vehicle 2 and pair with the same vehicle. In the instant case, the vehicle 1 may set a reference point 522 in the rear wheel area.

Figure 5C:
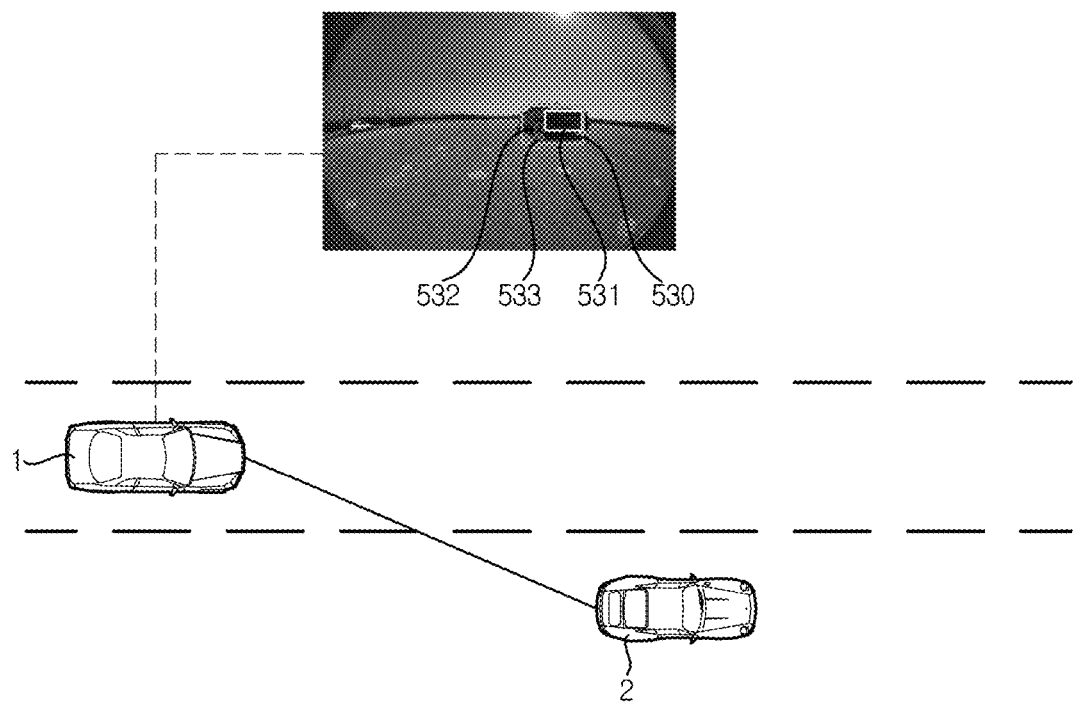

Referring to FIG. 5C, when the rear wheel area of the surrounding vehicle 2, the rear bumper area of the surrounding vehicle 2, and the full area of the surrounding vehicle 2 are detected, the vehicle 1 may form the bounding box to derive rear wheel area data 532, rear bumper area data 531, and the full area data 530, and pair with the same vehicle. In the present case, the vehicle 1 may set a reference point 533 in the rear wheel area.

Figure 5D:
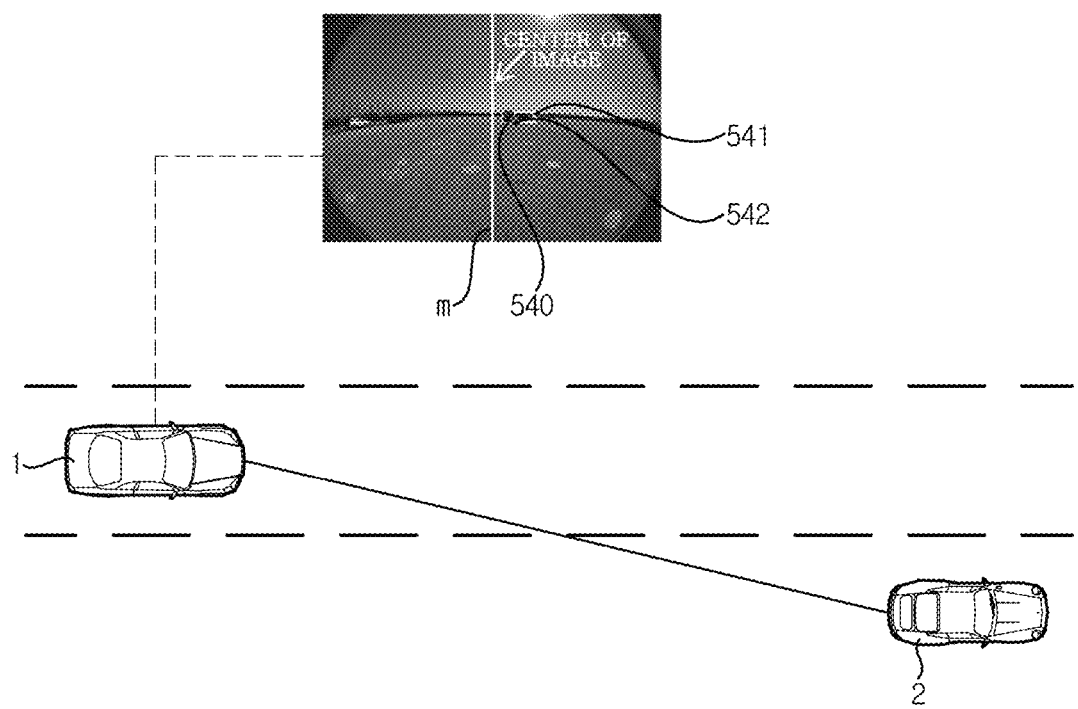

Referring to FIG. 5D, when the rear bumper area of the surrounding vehicle 2 and the full area of the surrounding vehicle 2 are detected, the vehicle 1 may form the bounding box to derive rear bumper area data 541 and the full area data 540, and pair with the same vehicle. In the instant case, the vehicle 1 may set a reference point 542 at a point closest to the line segment m passing through the center portion of the screen image and the rear wheel area.

Figure 6A:
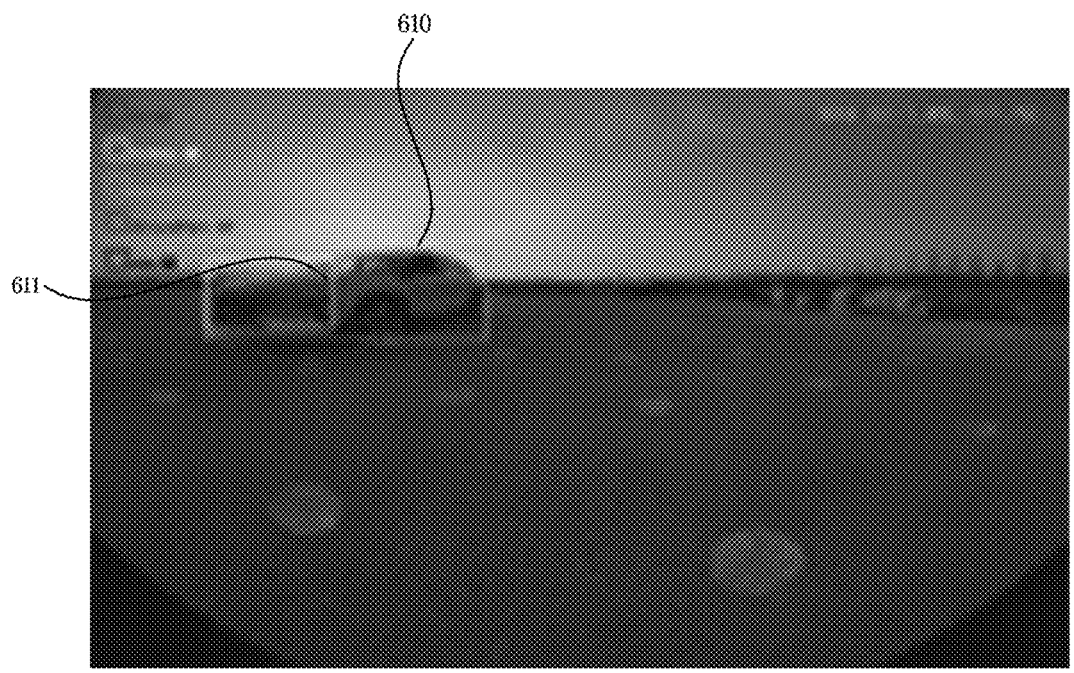
FIG. 6A, FIG. 6B, and FIG. 6C are views for a method of determining actual distance coordinates using a reference point of a vehicle according to various exemplary embodiments of the present invention.
Figure 6B:
Figure 6C:
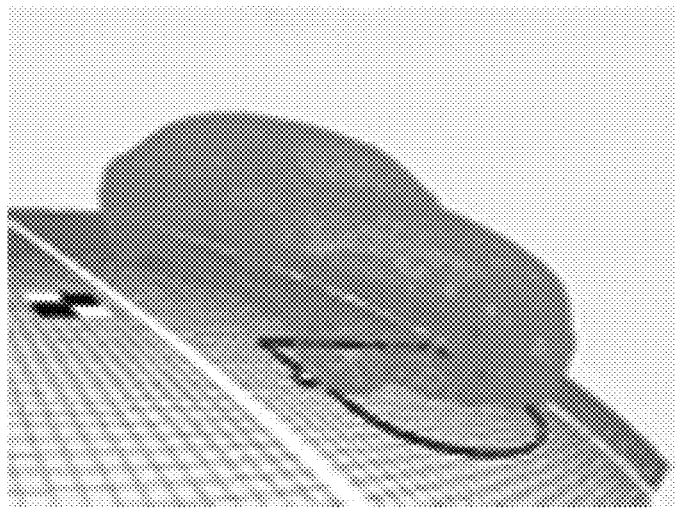

FIG. 6A, FIG. 6B, and FIG. 6C are views for a method of determining actual distance coordinates using a reference point of a vehicle according to various exemplary embodiments of the present invention.

Referring to FIG. 6A, the vehicle 1 may obtain 2D image coordinates of the surrounding vehicle 2.

The vehicle 1 may derive the object recognition data including full area data 610 and front bumper area data 611 of the surrounding vehicle 2.

Referring to FIG. 6B, the vehicle 1 may obtain original image coordinates of the surrounding vehicle 2.

Referring to FIG. 6C, the vehicle 1 may determine actual distance coordinates of the surrounding vehicle 2.

In more detail, the vehicle 1 may use the image obtained through a SVM camera as an input image for deep learning by correcting a bending of the image as a wide-angle image. Here, after setting the reference point for each recognized object (wheel area, bumper area, full area of the surrounding vehicle), an original image is transformed into the wide-angle image to determine an actual position value, and then the actual distance may be determined based on the LUT.

The vehicle 1 may determine the actual distance coordinates between the surrounding vehicle 2 and the vehicle 1, and determine the current speed of the surrounding vehicle 2 by applying longitudinal distance coordinates, lateral distance coordinates, the longitudinal distance speed (m/frame), and the lateral distance speed (m/frame) to the Kalman filter.

The Kalman filter is a filter that estimates an actual state based on a measurement value including noise, and may estimate values set using a system variable. The system variable of the Kalman filter may be set to a longitudinal distance position (coordinate), a lateral distance position (coordinate), the longitudinal distance speed, and a lateral distance speed. The Kalman filter may estimate system variable values in every image frame. To estimate the system variable in a current frame, the system variable estimated in a previous frame and the system variable value measured in the current frame may be used. At the instant time, the actual distance coordinates and speed values of the reference point set based on the object recognition result in the current frame may be set as the measured value.

The vehicle 1 may determine the speed value in a desired unit by reflecting an image obtainment speed (frame/s) of the camera 110 using a change amount (m/frame) of the distance value between the previous frame and the current frame as an output value of the Kalman filter.

Figure 7:
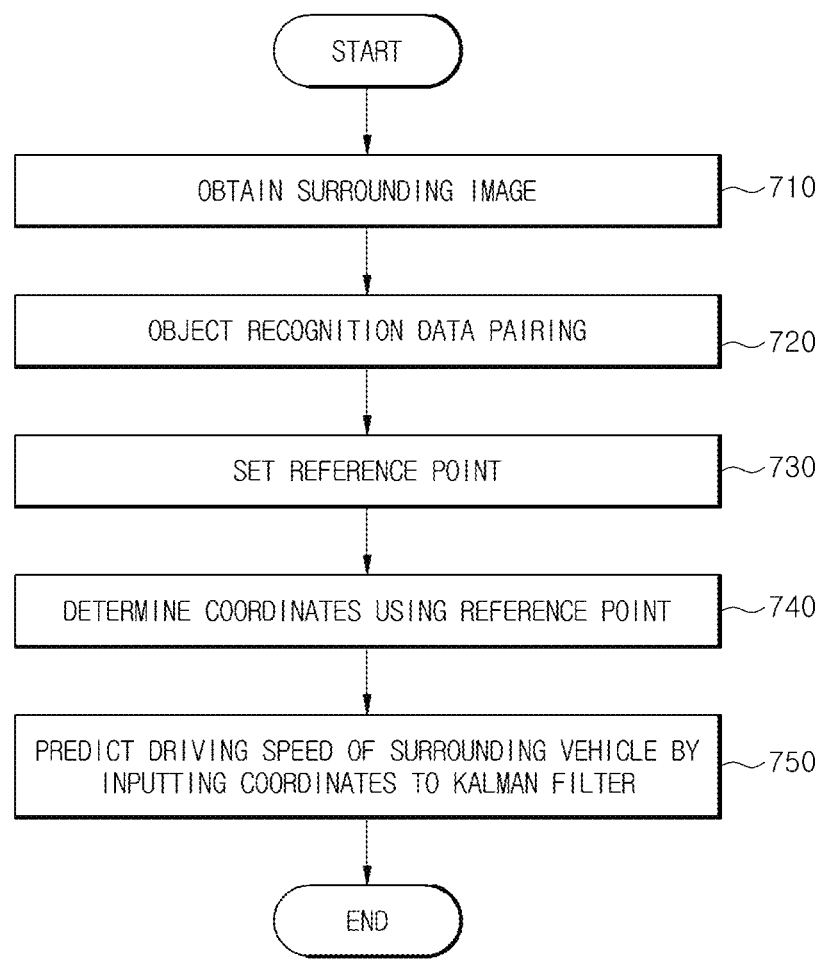
FIG. 7 is a flowchart illustrating a method of controlling a vehicle according to another exemplary embodiment of the present invention.

FIG. 7 is a flowchart illustrating a method of controlling a vehicle according to another exemplary embodiment of the present invention.

The vehicle 1 may obtain a surrounding image of the vehicle 1 (710).

The vehicle 1 may obtain the surrounding image including the surrounding vehicle 2 driving on the lane next to the lane in which the vehicle 1 is driving, and the surrounding image may be obtained as a plurality of image frames at the predetermined time intervals.

The vehicle 1 may detect the full area, the wheel area, and the front or rear bumper area of the surrounding vehicle 2 from the image of the surrounding vehicle 2, and may derive the object recognition data by forming the bounding box in the image corresponding to the detected full area, wheel area, and front or rear bumper area of the surrounding vehicle 2.

The vehicle 1 may pair the object recognition data of the surrounding vehicle 2 (720).

The vehicle 1 may set the reference point based on the object recognition data of the surrounding vehicle 2 (730).

For example, when the full area data of the surrounding vehicle 2, the front or rear bumper area data of the surrounding vehicle 2, and the wheel area data of the surrounding vehicle 2 are derived, the vehicle 1 may pair the full area of the surrounding vehicle 2 with the front or rear bumper area of the surrounding vehicle 2 and the wheel area of the surrounding vehicle 2, and may set the reference point to the wheel area.

For example, when the full area data of the surrounding vehicle 2 and the wheel area data of the surrounding vehicle 2 are derived, the vehicle 1 may pair the full area of the surrounding vehicle 2 with the wheel area of the surrounding vehicle 2, and may set the reference point to the wheel area.

For example, when the full area data of the surrounding vehicle 2 and the front or rear bumper area data of the surrounding vehicle 2 are derived, the vehicle 1 may pair the full area of the surrounding vehicle 2 with the front or rear bumper area of the surrounding vehicle 2, and may set the reference point to the rear bumper area.

For example, when the full area data of the surrounding vehicle 2 is not derived, and only data of the front or rear bumper area of the surrounding vehicle 2 is derived, the vehicle may set the reference point to the front or rear bumper area.

For example, when the full area data of the surrounding vehicle 2 is not derived, and only the wheel area data of the surrounding vehicle 2 is derived, the vehicle 2 may set the reference point to the wheel area.

The vehicle 1 may determine the coordinates of the set reference point and may determine the coordinates of the vehicle 1 (740).

In more detail, the vehicle 1 may set the longitudinal distance coordinates, the lateral distance coordinates, the longitudinal speed, and the lateral speed as the variable values of the Kalman filter using the coordinates of the set reference point and the coordinates of the vehicle 1.

The vehicle 1 may predict the driving speed of the surrounding vehicle 2 by applying the longitudinal distance coordinates, the lateral distance coordinates, the longitudinal speed, and the lateral speed to the Kalman filter (750).

Although not illustrated, it goes without saying that the vehicle 1 may perform the deep learning to derive the object recognition data by obtaining the image of the surrounding vehicle 2 including a top view of the surrounding vehicle 2.

According to the exemplary embodiments of the present invention, the vehicle sets the reference point based on the combination of objects recognized by the surrounding vehicle, and determines the speed of the surrounding vehicle using the reference point, facilitating an actual speed to be more accurately determined.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed exemplary embodiments. The recording medium may be implemented non-transitory as a non-transitory computer-readable recording medium.

The non-transitory computer-readable recording medium may include all types of recording media storing commands which may be interpreted by a computer. For example, the non-transitory computer-readable recording medium may be, for example, ROM, RAM, a magnetic tape, a magnetic disc, flash memory, an optical data storage device, and the like.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle for estimation a state of other vehicle using reference point of the other vehicle, the vehicle comprising:
    a camera configured to obtain an image of the other surrounding vehicle; and
    a controller configured to:
        identify at least one of full area data, wheel area data, and bumper area data of the other vehicle based on the image obtained by the camera,
        in response to the full area data being identified and at least one of the wheel area data, and the bumper area data being identified, control a performance of a pairing of the full area data and the at least one identified area data among the wheel area data and the bumper area data,
        in response that the full area data is not identified, or the wheel area data, and the bumper area data is not identified, control a non-performance of the pairing of the full area data, the wheel area data and the bumper area data,
        set a reference point in the at least one of the full area data, the wheel area data, and the bumper area data, and
        predict a driving speed of the other vehicle to provide for autonomous driving systems according to a change in a position of the set reference point,
    wherein the controller sets the position of the reference point differently in response that whether or not the pairing is performed, and
    wherein the pairing is grouping the full area data and the at least one identified area data among the wheel area data and the bumper area data.

2. The vehicle according to claim 1, wherein the controller is configured to:
    determine actual distance coordinates of the reference point; and
    determine longitudinal distance coordinates and lateral distance coordinates between the other vehicle and the vehicle using the determined actual distance coordinates of the reference point.

3. The vehicle according to claim 2, wherein the controller is configured to determine a longitudinal speed of the other vehicle and a lateral speed of the other vehicle using the actual distance coordinates of the reference point.

4. The vehicle according to claim 3, wherein the controller is configured to predict the driving speed of the other vehicle by applying at least one of the longitudinal distance coordinates, the lateral distance coordinates, the longitudinal speed, and the lateral speed to a Kalman filter.

5. The vehicle according to claim 1,
    wherein the bumper area data of the other vehicle includes front or rear bumper area data of the other vehicle, and
    wherein, in a response to a case where the full area data of the other vehicle, the front or rear bumper area data of the other vehicle, and the wheel area data of the other vehicle are determined, the controller is configured to pair a full area of the other vehicle, a front or rear bumper area of the other vehicle, and a wheel area of the other vehicle.

6. The vehicle according to claim 5, wherein the controller is configured to set the reference point in the wheel area.

7. The vehicle according to claim 1,
    wherein the bumper area data of the other vehicle includes front or rear bumper area data of the other vehicle, and
    wherein, in a response to a case where the full area data of the other vehicle and the front or rear bumper area data of the other vehicle are determined, the controller is configured to pair a full area of the other vehicle and a front or rear bumper area of the other vehicle.

8. The vehicle according to claim 7,
    wherein the controller is configured to set the reference point in the front or rear bumper area.

9. The vehicle according to claim 1, wherein, in a response to a case where the full area data of the other vehicle and the wheel area data of the other vehicle are determined, the controller is configured to pair a full area of the other vehicle and a wheel area of the other vehicle.

10. The vehicle according to claim 9, wherein the controller is configured to set the reference point in the wheel area.

11. A method of controlling a vehicle for estimation a state of other vehicle using a reference point of the other vehicle, the method comprising:
    obtaining, by a camera, an image of the other vehicle;
        identifying, by a controller, at least one of full area data, wheel area data, and bumper area data of the other vehicle based on the image obtained by the camera;
        in response to the full area data being identified and at least one of the wheel area data, and the bumper area data being identified, controlling, by the controller, a performance of pairing of the full area data and the at least one identified area data among the wheel area data and the bumper area data;
        in response that the full area data is not identified, or the wheel area data, and the bumper area data are not identified, controlling, by the controller, a non-performance of the pairing of the full area data, the wheel area data and the bumper area data; and
        setting, controlling, by the controller, a reference point in the at least one of the full area data, the wheel area data, and the bumper area data in response to whether or not the pairing is performed; and predicting, by the controller, a driving speed of the other vehicle to provide for autonomous driving systems according to a change in a position of the set reference point, wherein the setting the reference point includes setting the position of the reference point differently in response to whether or not the pairing is performed, and wherein the pairing is grouping the full area data and the at least one identified area data among the wheel area data and the bumper area data.

12. The method according to claim 11, further including:

determining, by the controller, actual distance coordinates of the reference point; and determining, by the controller, longitudinal distance coordinates and lateral distance coordinates between the other vehicle and the vehicle using the determined actual distance coordinates of the reference point.

13. The method according to claim 12, further including:

determining, by the controller, a longitudinal speed of the other vehicle and a lateral speed of the other vehicle using the actual distance coordinates of the reference point.

14. The method according to claim 13, further including:

predicting, by the controller, the driving speed of the other vehicle by applying at least one of the longitudinal distance coordinates, the lateral distance coordinates, the longitudinal speed, and the lateral speed to a Kalman filter.

15. The method according to claim 11, wherein controlling the performance of the pairing includes:

pairing, by the controller, a full area of the other vehicle, a front or rear bumper area of the other vehicle, and a wheel area of the other vehicle.

16. The method according to claim 15, wherein the setting the reference point includes:

setting, by the controller, the reference point in the wheel area.

17. The method according to claim 11, wherein the bumper area data of the other vehicle includes front or rear bumper area data of the other vehicle, and wherein the controlling the performance of the pairing includes in a response to a case where the full area data of the other vehicle and the front or rear bumper area data of the other vehicle are determined, pairing, by the controller, a full area of the other vehicle and a front or rear bumper area of the other vehicle.

18. The method according to claim 17, wherein the setting the reference point includes setting, by the controller, the reference point in the front or rear bumper areas area.

19. The method according to claim 11, wherein controlling the performance of the pairing includes:

in a response to a case where the full area data of the other vehicle and the wheel area data of the other vehicle are determined, pairing, by the controller, a full area of the other vehicle and a wheel area of the other vehicle.

20. The method according to claim 11, wherein the setting the reference point includes:

setting, by the controller, the reference point in the wheel area.

* * * * *